US010296411B1

(12) United States Patent
Diggins et al.

(10) Patent No.: US 10,296,411 B1
(45) Date of Patent: May 21, 2019

(54) ENDPOINT CALL BACKOFF IN A COMPUTING SERVICE ENVIRONMENT

(71) Applicant: Amazon Technologies, Inc., Seattle, WA (US)

(72) Inventors: Michael F. Diggins, Seattle, WA (US); Craig Wesley Howard, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 166 days.

(21) Appl. No.: 15/087,921

(22) Filed: Mar. 31, 2016

(51) Int. Cl.
*G06F 11/07* (2006.01)
*H04L 29/08* (2006.01)
*G06F 3/06* (2006.01)

(52) U.S. Cl.
CPC ........ *G06F 11/0793* (2013.01); *G06F 11/076* (2013.01); *G06F 11/079* (2013.01); *G06F 3/0653* (2013.01); *G06F 11/0754* (2013.01); *H04L 67/101* (2013.01); *H04L 67/1002* (2013.01); *H04L 67/1004* (2013.01); *H04L 67/1008* (2013.01)

(58) Field of Classification Search
CPC .. G06F 11/0754; G06F 11/076; G06F 3/0619; G06F 3/0614; G06F 3/0617; G06F 3/0653; H04L 67/10; H04L 67/1097; H04L 67/1002; H04L 67/1004; H04L 67/1008; H04L 67/101
See application file for complete search history.

(56) References Cited

U.S. PATENT DOCUMENTS 4,053,751 A * 10/1977 Ault .................... G06F 11/076 365/1
8,681,630 B1 * 3/2014 Gibson ................ H04L 67/325 370/235
2003/0041095 A1 * 2/2003 Konda ............. G06F 17/30569 709/201
2006/0143492 A1 * 6/2006 LeDuc ............... G06F 11/0715 714/2
2008/0307273 A1 * 12/2008 Nguyen ............... G06F 11/073 714/704
(Continued)

OTHER PUBLICATIONS

"Is it faster to count down than it is to count up?" by Stackoverflow published May 2010 https://stackoverflow.com/guestions/2823043/is-it-faster-to-count-down-than-it-is-to-count-up (Year: 2010).*

*Primary Examiner* — Joseph O Schell
(74) *Attorney, Agent, or Firm* — Thorpe North & Western, LLP

(57) ABSTRACT

A technology is provided for call failure backoff in a computing service environment. An allowable call failure rate is defined for application programming interface (API) calls sent to one or more endpoints. Each endpoint may use a token bucket containing a plurality of tokens, wherein a single token is defined as being equal to one API call failure. A number of tokens in the token bucket are determined prior to executing an API call to the one or more endpoints. A health status of the one or more endpoints is identified according to the number of tokens in the token bucket. The API calls to the one or more endpoints having the determined number of tokens in the token bucket that are equal to zero or may be delayed for a predetermined backoff time period.

21 Claims, 8 Drawing Sheets

(56) References Cited

U.S. PATENT DOCUMENTS

| | | | | |
|---|---|---|---|---|
| 2012/0036045 | A1* | 2/2012 | Lowe | G06Q 20/02 705/26.44 |
| 2015/0026525 | A1* | 1/2015 | Byrne | G06F 11/079 714/39 |

* cited by examiner

ENDPOINT CALL BACKOFF IN A COMPUTING SERVICE ENVIRONMENT

BACKGROUND

Computing systems may be found in the workplace, at home, or at school. Computing systems may include computing and data storage systems to process and store data. Some computing system have begun offering centralized virtual computing options that may reduce costs, improve availability, improve scalability, and reduce time to deploy new applications. For example, some computing systems may act as a managed service that provides virtual computing, virtual storage, virtual networking and other virtual services for variable periods on a pay-per-use basis from large pools of re-purposable, multi-tenant computing resources. However, challenges may arise when system errors are present and it is unknown whether a computing error is caused by the computing service or some other aspect of the computing system. Thus, the perception of efficiency and quality of the computing service may be negatively impacted.

DETAILED DESCRIPTION

Figure 1:
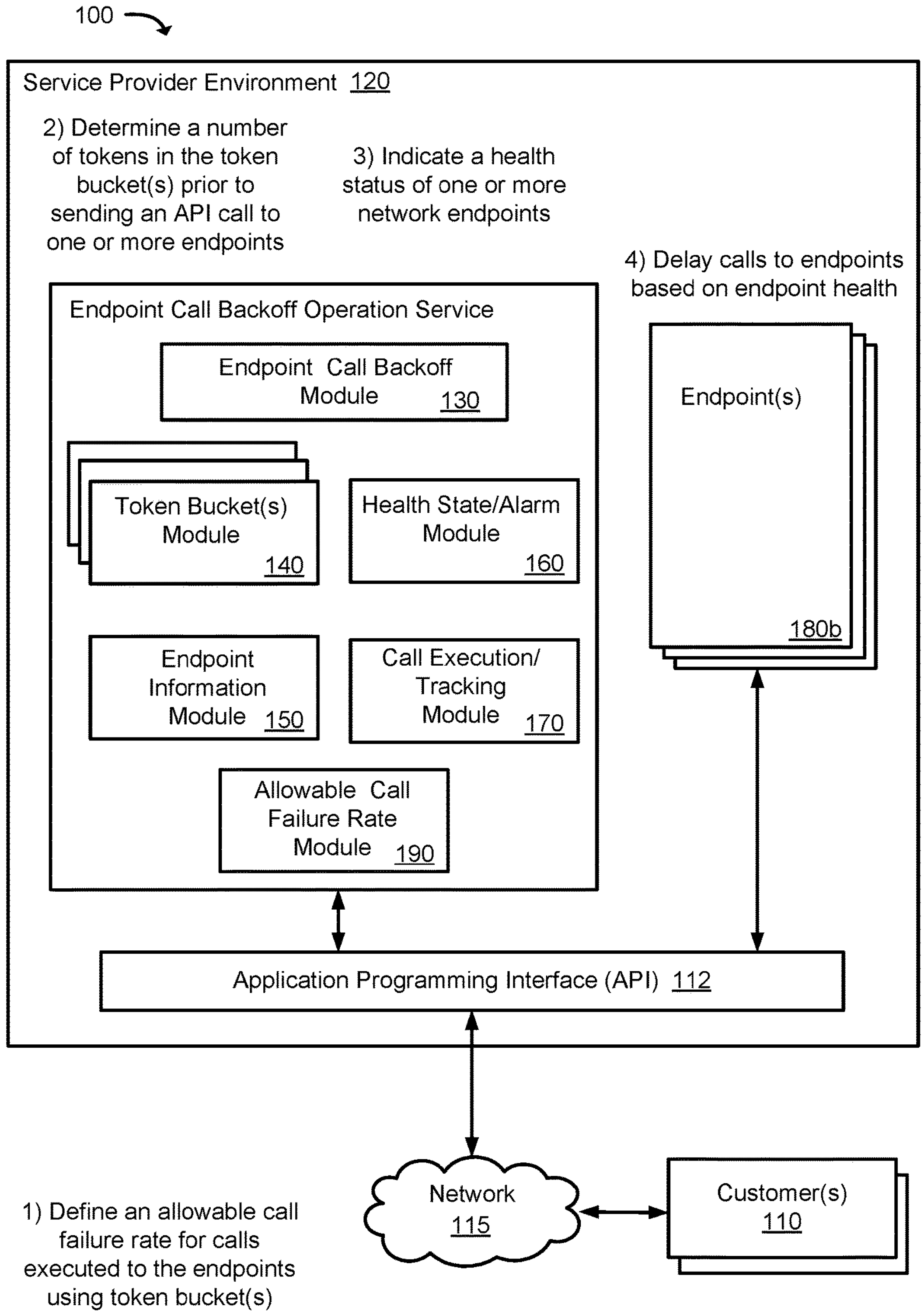
FIG. 1 illustrates a system for providing endpoint call backoff in a service provider environment according to an example of the present technology.

This technology relates to providing computing systems and resources for providing endpoint call backoff for an application programming interface (API) service in a computing service environment. In one aspect, a customer's device or an application may be connected to a web service which may provide a variety of services to the customer or the application. The customer's device or application may communicate with the web service via an interface, such as an application programming interface (API), which may be a web services interface or any other type of API service.

In one aspect, an endpoint (e.g., customer access endpoint) may be provided to execute API call received by the API service. For example, an endpoint may have a uniform resource locator (URL) that may be an entry point for the web service. In other words, the endpoint may have a URL that identifies a host and port as the entry point for the endpoint which may perform the work for the API service (the term API interface may also be used interchangeably here for API service). One or more regional endpoints may also be provided to enable faster connectivity. The endpoint may be a web server, which may be addressed with the URL, and may be in one or more locations, such as in a similar location of the web service and/or geographically remote from the web service. The endpoint may execute and perform one or more API calls through the API service provided by the web server. The API service may issue a call to the endpoint to perform some function or request and the endpoint may return a result through the API service to the customer, such as a mobile application, mobile device, and/or on-premise application.

The present technology provides an allowable call failure rate that may be defined for application programming interface (API) calls sent to one or more endpoints, by using a token bucket containing a plurality of tokens for each endpoint. A single token may be defined as being equal to one API call failure and a single token may be removed from a token bucket upon an API call failure to an endpoint. A number of tokens in the token bucket may be determined prior to sending an API call to the one or more endpoints for execution. A health status of the one or more endpoints may be identified according to the number of tokens in the token bucket. The API calls to the one or more endpoints having a determined number of tokens in the token bucket that is equal to zero or equal to or less than a defined number of tokens may be delayed for a first predetermined backoff time period. The endpoints having the determined number of tokens in the token bucket below the allowable call failure rate and/or zero tokens in the token bucket may be considered as unhealthy endpoints. The call failure backoff may be performed for the unhealthy endpoints.

As discussed above, a number of tokens in the token bucket may be determined prior to executing an API call at the endpoint. A total token count number in the token bucket may be decremented when the failed API call is identified. API calls to the endpoint may be delayed upon determining the number of tokens in the token bucket is zero or the number of tokens is below the allowable call failure rate. An additional token (e.g., a bonus token) may be added to the token bucket for each successful API call to the endpoint or for each successful group of API calls to the endpoint. The token bucket may also be refilled with at least one token per predefined time period which passes. In this way, an endpoint that is in an unhealthy state may be returned to a healthy state by having at least one token in the token bucket.

FIG. 1 illustrates a system 100 for providing an endpoint call backoff operation in a service provider environment according to an example of the present technology. The system 100 may include one or more endpoints (illustrated in FIG. 1 as 180*b* and may be individually and/or collectively referred to as "180"), a network 115, a customer 110, and a service provider environment 120, which may provide virtualized computing services (i.e., virtualized computing, virtualized storage, virtualized networking, etc.) to a customer 112. More specifically, the service provider environment 120 may provide virtualized computing, virtualized storage, virtualized networking and other virtualized services that are executing on a hardware substrate. Also, the service provider environment 120 may be in data communication with one or more customers 110 by way of the network 115 that may include a virtual network that is within a service provider environment 120 or other suitable networks, etc.

The service provider environment 120 may include an application programming interface 112, an endpoint call backoff module 130, a token bucket module 140, a health state/alarm module 160, an endpoint information module 150, a call execution (e.g., an API call execution)/tracking module 170, and an allowable call failure rate module 190. It should be noted that in one aspect, the endpoints 180 may be included with the service provider environment 120 and/or remotely located from the service provider environment 120. In one aspect, the application program interface (API) 112 may be provided for the service provider to receive application programming interface (API) calls at one or more endpoints 180. In one aspect, the customer 110 may configure the API 112, such as creating the APIs, defining resources within the API, and the methods for resources of the API.

In one example configuration, the API may be a representation state transfer ("REST") API. Similarly, the customer may be a software application that communicates: over HTTP (Hyper Text Transfer Protocol), using XML (extensible Markup Language) standards including SOAP (Simple Object Access Protocol), WSDL (Web Services Description Language), JavaScript Object Notification (JSON), and/or UDDI (Universal Description, Discovery, and Integration). In one aspect, the web service may refer to an application that can be invoked through the Internet. Also, the web services, for example, may include computing services, networking services, content delivery services, database services, deployment services, management services, applications services, and the like. The API may be responsible for managing requests and responses between the customer and the web service. In one aspect, the API may also be a customer defined API.

In one aspect, the endpoint call backoff module 130 may perform endpoint call backoff operations (e.g., delaying or exponentially delaying API calls to one or more endpoints) that may be defined as delaying one or more API calls to the one or more endpoints 180 for a predetermined backoff time period when the determined number of tokens in the token bucket is equal to zero or less than a defined number of tokens. The token bucket module 140 may provide a token bucket for each endpoint. That is, the endpoint call backoff module 130 may perform endpoint call backoff operations by delaying or exponentially delaying API calls to one or more endpoints when the determined number of tokens in the token bucket is zero. In one aspect, the number of tokens in the token bucket are being tracked. When the number of tokens in the token bucket are zero, the endpoint call backoff module 130 may perform the endpoint call backoff operations. In one aspect, the number of call failures are not explicitly tracked, but the number of tokens in the token bucket is known, where each token represents a call failure.

The health state/alarm module 160 may be used to identify a health state of the endpoints. The health state/alarm module 160 may also issue one or more alarms and/or alerts relating to the health state of the endpoints. For example, one or more endpoints 180 may be defined as having an unhealthy state if the number of tokens in the token bucket is determined to be zero or below a predetermined number of tokens. For example, an endpoint having a token bucket with zero (0) tokens may be determined to be unhealthy. Alternatively, an endpoint may be determined to be unhealthy if the number of tokens in the token bucket is less than a defined numerical value, such as 5 tokens. In one aspect, the endpoint may be defined as having a healthy state if there is at least one token in the token bucket or a number of tokens in the token bucket are above a predetermined number of tokens. In one aspect, the token bucket may be defined to contain a predetermined number of tokens. That is, the token bucket may have a predefined, maximum capacity of tokens. Alternatively, an endpoint may be defined as being healthy if there is at least one token in the token bucket associated with the endpoint. In one aspect, the present technology tracks the number or a percentage of unhealthy endpoints and/or the number or a percentage of healthy endpoints.

The endpoint information module 150 may be used to collect, store, and process information and/or historical data regarding each endpoint 180. For example, the endpoint information module 150 may store and process, in real time, the state of each endpoint, which may be used to assist with determining the health of the each of the endpoints 180.

The call execution/tracking module 170 may be used to receive from and/or send to the endpoints 180 one or more API calls initiated by a customer, application or similar source. The call execution/tracking module 170 may also track the number of API calls sent to and/or received from each one of the endpoints. In one aspect, the total number of endpoints 180 being tracked may be bounded and predefined. The call execution/tracking module 170 may use and/or include an endpoint tracker key specifying an endpoint identification (ID) to access information, such as that stored in the endpoint information module 150 relating to endpoints and the number of tokens in the token bucket for each of the endpoints.

Also, the information collected, processed, and/or stored regarding each endpoint may include, for example, internal endpoint metrics, health status history log files, issued alarm messages and/or set alarms, resource utilization, application performance, and operational health.

In operation, 1) an allowable call failure rate may be defined for application programming interface (API) calls sent to one or more endpoints 180 and the call failure rate tracking may use a token bucket containing a plurality of tokens. A single token may be defined as being equal to one API call failure. 2) A number of tokens in the token bucket may be determined prior to sending an API call received from a customer to the one or more endpoints for execution. If the API call fails then a token is removed from the bucket. 3) A health status of the one or more endpoints may be identified according to the number of tokens in the token bucket. 4) The API calls to the one or more endpoints having a determined number of tokens in the token bucket equal to zero or equal to or less than a defined number of token may be delayed for a first predetermined API call delay (e.g., backoff) time period. For example, in operation, if a token bucket associated with an endpoint runs out of tokens, the endpoint associated with the empty token bucket can be identified and determined to be an unhealthy endpoint. Thus, if a token bucket is empty, one or more API calls to the endpoint associated with the empty token bucket can be restricted or delayed until at least one token is present in the token bucket. A token may be added to each token bucket for each endpoint per predetermined unit of time, such as per second.

It should also be noted that following the API call delay time period, the token bucket may be checked again to determine if a token is present. If a token is present, the endpoint may be returned to a healthy state and resume one or more API calls to the endpoints. Alternatively, if no token is present in the token bucket, a second API call delay may be executed for a second predetermined API call delay (e.g., backoff) time period. The second API call delay may be exponentially greater than the first API call delay. That is, the second predetermined API call delay time period may be exponentially greater than the first predetermined API call delay time period. The first predetermined API call delay time period and the exponential back off rate (used by the second predetermined API delay) may be predefined, such as, by a customer.

In one aspect, as part of a monitoring operation, each of the endpoints may be checked to determine the health state of the endpoints at predefined health state check time periods. In one aspect, an aggregate unhealthy endpoint threshold may be set. The aggregate unhealthy endpoint threshold may be a defined number of unhealthy endpoints and/or a percentage of a total number of endpoints that are unhealthy. Thus, if the aggregate total number of unhealthy endpoints is equal to and/or greater than the aggregate unhealthy endpoint threshold, then an alarm or alert may be issued warning system operators. In this way, the aggregate unhealthy endpoint threshold may be used to identify one or more system errors relating to the web services as opposed to an endpoint alone. An operator of the web services may be alerted by the alarm message to diagnose the web service system error according to one or more web services service procedures.

Thus, by using the components, modules, devices, and/or services provided in FIG. 1, the present technology provides solutions for when endpoints become unreliable in stability or unreliable in sustaining a given amount of traffic (e.g., load), or when a negative impact is placed upon the web service. For example, a single customer endpoint having stability problems may impact the ability of the web service or API service to provide computing efficiency relating to other customer endpoints. Also, if the customer endpoint is unable to handle a given load, the quality of service provided to the customer's API calls may be negatively affected. Thus, a significant number of requests to the API may not be serviced without the configurations as described herein. Further, the present technology provides solutions to prevent one or more of the customer endpoints from suffering when a web service provider is subject to network or infrastructure irregularities.

Furthermore, the present technology provides solutions for tolerating a certain number of call failures to one or more of the endpoints while addressing the challenges facing the endpoints in light of the fact that an API may be a small volume API, which may handle a small volume of API calls per unit of time, such as two or three API calls per minute. Also, the present technology may address the challenges facing endpoints given that an API may be a large volume API, which may handle a large volume of API calls per unit of time, such as several thousands of requests per second. For example, an endpoint may completely shut down and become non-operational but if the API is a small volume API then only a few failures per minute may be detected despite there being a serious problem. If the endpoint is fully functioning and is operational and the API is a large volume API and just a few failures per minute are detected, it may be difficult to determine if the endpoint is healthy and/or unhealthy because a few failures may be acceptable for a large volume API. Thus, the present technology provides solutions for ascertaining, determining, and knowing the health state of an endpoint as well as tolerating a defined number of call failures or a percentage of the total call failures regardless of whether the API is a large volume API or a small volume API.

Figure 2:
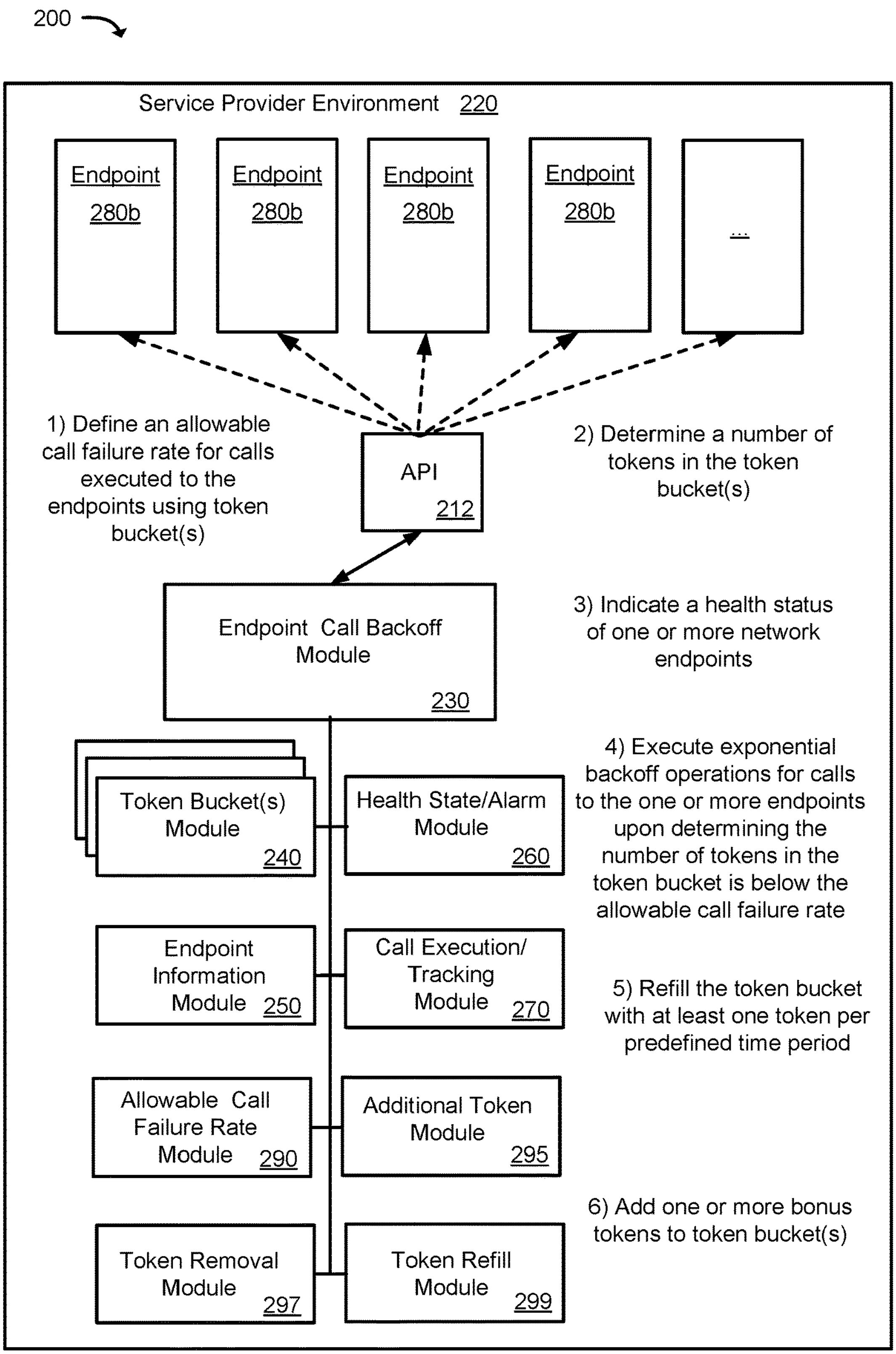
FIG. 2 illustrates a system for providing endpoint call backoff in a service provider environment according to an example of the present technology.

FIG. 2 illustrates the system 200 for providing an endpoint call backoff operation associated with an API service in a service provider environment. In one aspect, each of the components, modules, and/or services described in FIG. 1 may also apply to the components, modules, and services of FIG. 2. Also, one or more of the operations and steps of FIG. 1 may also be included in one or more operations or actions of FIG. 2.

Similar to FIG. 1, the system 200 may include one or more endpoints (illustrated in FIG. 2 as **280*b* and may be individually and/or collectively referred to as "280"), and a service provider environment 220, which may provide virtualized computing services (i.e., virtualized computing, virtualized storage virtualized networking, etc.) to a customer. More specifically, the service provider environment 220 may provide the virtualized computing, virtualized storage, virtualized networking and other virtualized services using a hardware substrate of hardware hosts. Also, the service provider environment 220 may be in data communication with one or more customers by way of the network (see network 115 of FIG. 1**) that may include a virtual network that is within a service provider environment or other suitable networks, etc.

The service provider environment 220 may include an application programming interface 212, an endpoint call backoff module 230, a token bucket module 240, a health state/alarm module 260, an endpoint information module 250, a call execution (e.g., an API call execution)/tracking module 270, an allowable call failure rate module 290, an additional token module 295 (e.g., a bonus token module 295) for adding additional tokens to a token bucket, a token removal module 297 for removing tokens from the token bucket, and a token refill module 299 for refilling token buckets. It should be noted that in one aspect, the endpoints 280 may be included with the service provider environment 220 and/or remotely located from the service provider environment 220. In one aspect, the application program interface (API) 212 may be provided for the service provider to issue application programming interface (API) calls to one or more endpoints 280. Also, the token bucket module 240 may include a token counter for incrementing and/or decrementing the number of tokens in the token bucket.

In one aspect, the endpoint call backoff module 230, the token bucket module 240, the health state/alarm module 260, the endpoint information module 350, the call execution (e.g., an API call execution)/tracking module 270, the allowable call failure rate module 290, the additional token module 295, the token removal module 297, and the token refill module 299 may each operate in the service provider environment 220 or operate outside the service provider environment. The endpoint call backoff module 230, the token bucket module 240, the health state/alarm module 260, the endpoint information module 350, the call execution (e.g., an API call execution)/tracking module 270, the allowable call failure rate module 290, the additional token module 295, the token removal module 297, and the token refill module 299 may also run as a separately as a function in a container that is executing in a computing instance. The endpoint call backoff module 230, the token bucket module 240, the health state/alarm module 260, the endpoint information module 350, the call execution (e.g., an API call execution)/tracking module 270, the allowable call failure rate module 290, the additional token module 295, the token removal module 297, and the token refill module 299 may also be executing independently on separate computing instances.

In operation, FIG. 2 may include 1) defining an allowable call failure rate for application programming interface (API) calls sent to one or more endpoints 180 using a token bucket for each endpoint that may contain one or more tokens. A single token may be defined as being equal to one API call failure. A token may be removed from a token bucket when an API call failure occurs 2) A total number of tokens in the token bucket may be determined prior to sending one or more API calls to the one or more endpoints from the call execution module 270. 3) A health status of the one or more endpoints may be identified and indicated according to the number of tokens in the token bucket using the health state/alarm module 260. 4) The API calls to the one or more endpoints having a number of tokens in the token bucket equal to zero or equal to or less than a defined number of tokens may be exponentially delayed.

In one aspect, the exponential call backoff operation (e.g., an exponential delay) may be defined and explained as follows. Prior to issuing an API call for execution by an endpoint or sending the API request to an endpoint, the token bucket for the endpoint may first be checked to ascertain the presence of any tokens in the token bucket. If the token bucket is determined to be empty and/or the number of tokens in the token bucket are below the allowable call failure rate, the API calls to the endpoint associated with the empty token bucket may be delayed for an $X^n$ periods of time that pass (e.g., "X" amount of seconds, microseconds, milliseconds, or time units where X is the initial backoff time period and X is a value greater than 1, and N is the number of recent sequential API call failures), which may be referred to as predetermined time periods (e.g., a first predetermined time period of delay). Said differently, each subsequent call failure backoff may provide a failure backoff period to increase delays for API calls sent to one or more endpoints at a rate of $X^N$, where X is the initial backoff time period and N is the number of recent failures. In one example, X may be an integer, but may also be a non-integer. In one aspect, X is a value greater than 1. For example, setting X being equal to 10 (e.g., 10 milliseconds) the backoff for each subsequent failure would be illustrated as $10^1=10$, $10^2=100$, or $10^3=1000$). Thus, if N equals 1 recent number of failures there would be a 10 millisecond failure backoff period, and if N equals 2 recent number of failures there would be a 100 millisecond failure backoff period (e.g., $10^2=100$), and/or if N equals 3 recent numbers of failures there may be an 100 millisecond failure backoff period (e.g., $10^3=100$), etc. Thus, for each subsequent time the token bucket is determined to be empty and/or the number of tokens in the token bucket are equal to or less than a defined number of tokens, the API calls to the endpoint associated with the token bucket may be delayed for a second period of time that passes, which may be referred to as a second predetermined time period. The second predetermined time period may be exponentially greater than the first predetermined time period. For example, if X is equal to 10 milliseconds (e.g., the initial back off time period is $10^2$) the second predetermined time period may be ten times the amount of the first predetermined time period, such that the first predetermined time period is equal to 10 milliseconds and the second predetermined time period being equal to 100 milliseconds (e.g., $\mathbf{10^2}$). A third predetermined time period (e.g., $10^3$) may be exponentially greater than the amount of the second predetermined time period, such as the third predetermined time period being equal to 1000 milliseconds, and so forth. Furthermore, the exponential delay may include a maximum time period for the exponential delay (e.g., exponential API call backoff operation), wherein the time period that passes may not exceed a predetermined maximum period of time. For example, the maximum time period may be set to equal 1000000 milliseconds.

The token bucket may be refilled with at least one token per predefined time period which passes. In this way, an endpoint that is in an unhealthy state may be returned to a healthy state by having at least one token added to the token bucket per predefined time period. For example, in one aspect, for each endpoint, a refill operation may fill each token bucket for each endpoint according a refill rate. For example, the refill rate may be defined as refilling each token bucket for each endpoint with a single token per predetermined unit of time, such as refilling the token bucket with one token per second. In one aspect, the refill rate may be defined as refilling a single token bucket associated with a group of tokens with a single token per predetermined unit of time.

For example, each token bucket for each endpoint may be refilled with at least one token per second. Each token may represent a single API call failure or a token may be consumed from a bucket when an API call failure occurs. However, in order to execute an API call to the endpoint, at least one token is to be included in the token bucket associated with an endpoint or a group of endpoints. For example, if an endpoint is determined to be in an unhealthy state (e.g., tokens in the token bucket are below an allowable call failure rate or the token bucket is empty), at least one token may be added to each token bucket for each endpoint per predetermined unit of time, such as per second, according to the defined refill rate. 6) One or more additional tokens (e.g., bonus tokens) may be added to a baseline number of tokens in the token bucket(s) upon occurrence of a predetermined number of successful calls (e.g., successful API calls) to one or more endpoints. For example, for every "X" number of successful API calls, "Y" tokens may be added as additional tokens to the token bucket, where X and Y may be positive integers.

In one aspect, for example, the allowable call failure rate may be defined as allowing 1 percent (%) of total API calls be allowable failed API calls. Thus, for example, upon occurrence of every 100 successful API calls to an endpoint, 1 additional token may be added to the bucket. In this way, large volume API calls to an endpoint may have an allowable and acceptable call failure rate even though an absolute number of call failures per unit of time may be significantly large relative to the acceptable call failure rate.

Figure 3:
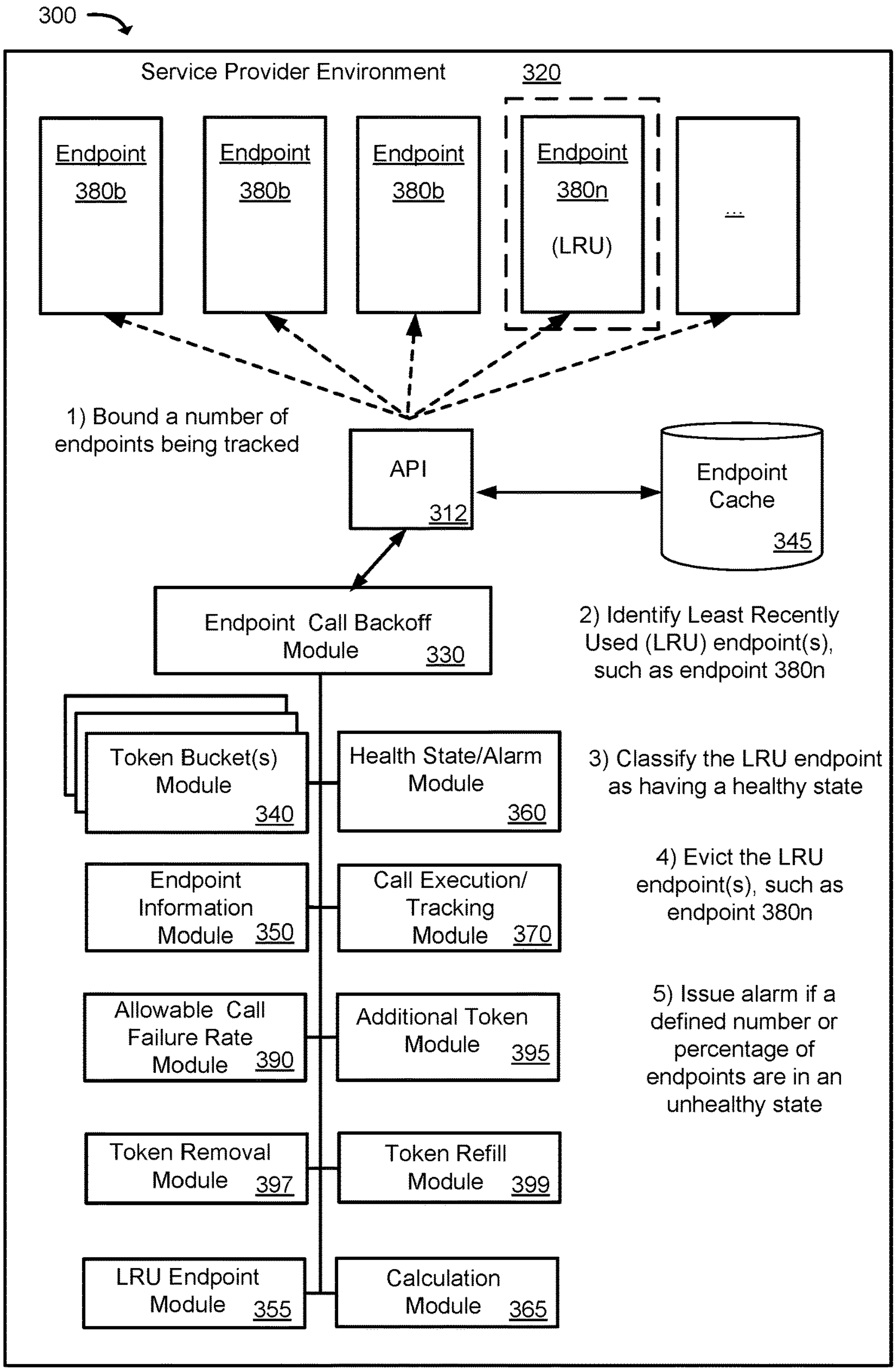
FIG. 3 illustrates a system for providing endpoint call backoff and evicting least recently used endpoints in a service provider environment according to an example of the present technology.

FIG. 3 illustrates the system 300 for providing endpoint call backoff in a service provider environment according to an example of the present technology. In one aspect, each of the components, modules, and/or services described in FIGS. 1-2 may also apply to the components, modules, and services of FIG. 3. Also, one or more of the operations or actions of FIGS. 1-2 may also be included in one or more operations or actions of FIG. 3.

Similar to FIGS. 1-2, the system 300 may include one or more endpoints (illustrated in FIG. 3 as 380*b* and may be individually and/or collectively referred to as "380"), a service provider environment 320, which may provide virtualized computing services (i.e., virtualized computing services, virtualized networking, etc.) to a customer. More specifically, the service provider environment 320 may provide virtualized computing, virtualized storage, virtualized networking and other virtualized services that are executing on a hardware substrate. Also, the service provider environment 320 may be in data communication with one or more customers by way of the network (see network 115 of FIG. 1) that may include a virtual network that is within a service provider environment or other suitable networks, etc.

The service provider environment 320 may include an application programming interface (API) 315, an endpoint call backoff module 330, a token bucket module 340, a health state/alarm module 360, an endpoint information module 350, a call execution (e.g., an API call execution)/tracking module 370, an allowable call failure rate module 390, a calculation module 365 for calculating the number of tokens in bucket or other endpoint statistics as needed, a least recently used (LRU) endpoint module 355 for determining, managing, monitoring, and evicting LRU endpoints from one or more groups of endpoints, an additional token module 395 for adding additional tokens to a token bucket, a token removal module 397 for removing tokens from the token bucket, and a token refill module 399 for refilling token buckets. It should be noted that in one aspect, the endpoints 380 may be included with the service provider environment 320 and/or remotely located from the service provider environment 320. In one aspect, the application program interface (API) 312 may be provided for the service provider to issue application programming interface (API) calls to one or more endpoints 380. Also, the token bucket module(s) 340 may include a token counter for incrementing and/or decrementing the number of tokens in the token bucket. In one aspect, endpoint **380*n* is indicated as an LRU endpoint, for illustration purposes. Also, the service provider environment 320 may include and be in communication with an endpoint cache 345. The endpoint cache may be included in the service provider environment 320 or may be geographically remote from the service provider environment 320. More specifically, the endpoint cache 345 may be used for and by the endpoint information module 350**.

In operation, FIG. 3 may include 1) binding a total number of endpoints being tracked to form a group of endpoints. 2) The least recently used (LRU) endpoint(s), such as endpoint **380*n***, may be identified. 3) The LRU endpoint(s) can be classified as having a healthy state, which may be a default state for each LRU endpoint. 4) The LRU endpoint(s) can be evicted. 5) One or more alarms may be issued if a defined number of endpoints and/or a percentage of the total number of endpoints (e.g., the bounded number or defined number of tracked endpoints) are in an unhealthy state. In one aspect, the LRU endpoint(s) may be evicted to free up processing power, memory, and/or other computing services.

In one aspect, an endpoint cache 345 may be used, such as a data structure that is accessible in a data store service, and an endpoint tracker key may be stored in the data store service. The endpoint tracker key may specify an endpoint identification (ID) in order to access information relating to the one or more endpoints 380 and the number of tokens in the token bucket for each of the one or more endpoints 380. Using the endpoint tracker key, the information for each of the one or more endpoints 380 may be collected. For example, the health state of the one or more endpoints may be identified according to the collected information.

In one aspect, the endpoints 380 may be tracked and monitored. The processing power and memory of computing systems associated with the API calls and/or endpoints in the service provider environment may be completely recorded and used as part of tracking and monitoring a bounded number of endpoints. Thus, in one aspect, a least recently used (LRU) eviction operation may be used to evict one or more "healthy" endpoints that are being tracked and are least recently used to free up computing resources associated with the service provider environment 320, increase the processing of API calls and/or endpoints 380. For example, a customer may not have sent API calls for a significant period of time (e.g., greater than 10 seconds or 1 minutes) with little to no API calls being sent to an endpoint for the customer. However, the refill rate operation may continue be executed to fill each token bucket with tokens. Thus, the LRU endpoint may be considered as healthy and may be evicted, since the state of the endpoint **380*n* may be similar to an uninitialized state and appears to be healthy. Thus, the LRU endpoint 380*n* may be evicted from the bound tracking endpoints 380**.

Figure 4:
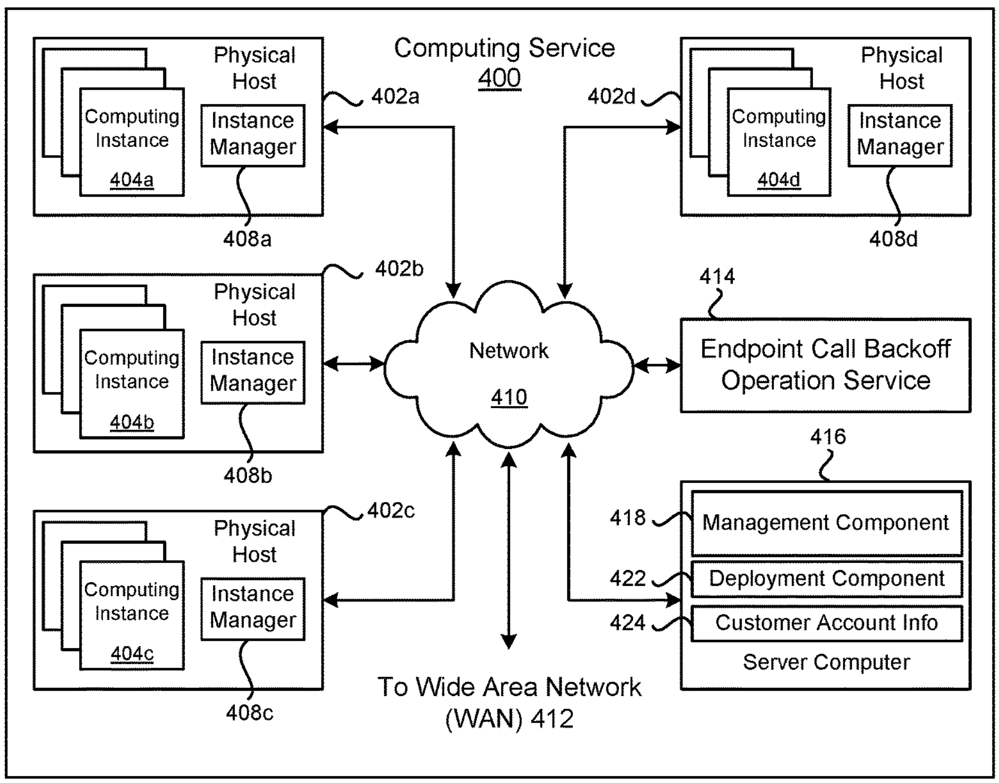
FIG. 4 is a block diagram that illustrates an example computing service environment that includes an endpoint call backoff service according to an example of the present technology.

FIG. 4 is a block diagram illustrating an example computing service 400 that may be used to execute software services for providing an endpoint call backoff operation in a computing service environment. In particular, the computing service 400 depicted illustrates one environment in which the technology described herein may be used. The computing service 400 may be one type of environment that includes various virtualized service resources that may be used, for instance, to host computing instances **404*a-d*** on which a computing service may execute.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running web browsers or other lightweight client applications, for example. Illustratively, the computing service 400 may be described as a "cloud" environment.

The particularly illustrated computing service 400 may include a plurality of server computers **402*a-d*. While four server computers are shown, any number may be used, and large data centers may include thousands of server computers. The computing service 400 may provide computing resources for executing computing instances 404*a-d*. Computing instances 404*a-d* may, for example, be virtual machines. A virtual machine may be an instance of a software implementation of a machine (i.e., a computer) that executes applications like a physical machine. In the example of a virtual machine, each of the server computers 402*a-d*** may be configured to execute an instance manager

408*a-d* capable of executing the instances. The instance manager 408*a-d* may be a hypervisor, virtual machine monitor (VMM), or another type of program configured to enable the execution of multiple computing instances 404*a-d* on a single server. Additionally, each of the computing instances 404*a-d* may be configured to execute one or more applications.

Some of the servers may be used for executing an endpoint call backoff operation service (e.g., an exponential API call delay operation service). For example, a server computer 414 may execute an endpoint call backoff operation service in a computing service environment. For example, the endpoint call backoff operation service may act as the API call node and use computing instances 404*a-c* as the endpoint nodes or the endpoint call backoff operation service may use a computing instance 404*a-c* as the API node which communicates with other endpoint nodes that are computing instances 404*a-c*.

One or more server computers 416 may be reserved to execute software components for managing the operation of the computing service 400 and the computing instances 404*a-d*. A server computer 416 may execute a management component 418. A customer may access the management component 418 to configure various aspects of the operation of the computing instances 404*a-d* purchased by a customer. For example, the customer may setup computing instances 404*a-d* and make changes to the configuration of the computing instances 404*a-d*.

A deployment component 422 may be used to assist customers in the deployment of computing instances 404*a-d*. The deployment component 422 may have access to account information associated with the computing instances 404*a-d*, such as the name of an owner of the account, credit card information, country of the owner, etc. The deployment component 422 may receive a configuration from a customer that includes data describing how computing instances 404*a-d* may be configured. For example, the configuration may include an operating system, provide one or more applications to be installed in computing instances 404*a-d*, provide scripts and/or other types of code to be executed for configuring computing instances 404*a-d*, provide cache logic specifying how an application cache may be prepared, and other types of information. The deployment component 422 may utilize the customer-provided configuration and cache logic to configure, initialize, and launch computing instances 404*a-d*. The configuration, cache logic, and other information may be specified by a customer accessing the management component 418 or by providing this information directly to the deployment component 422.

Customer account information 424 may include any desired information associated with a customer of the multi-tenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402*a-d*, 416. The network 410 may be a local area network (LAN) and may be connected to a Wide Area Network (WAN) 412 or the Internet, so that end customers may access the computing service 400. The network topology illustrated in FIG. 4 has been simplified; many more networks and networking devices may be utilized to interconnect the various computing systems disclosed herein.

Figure 5:
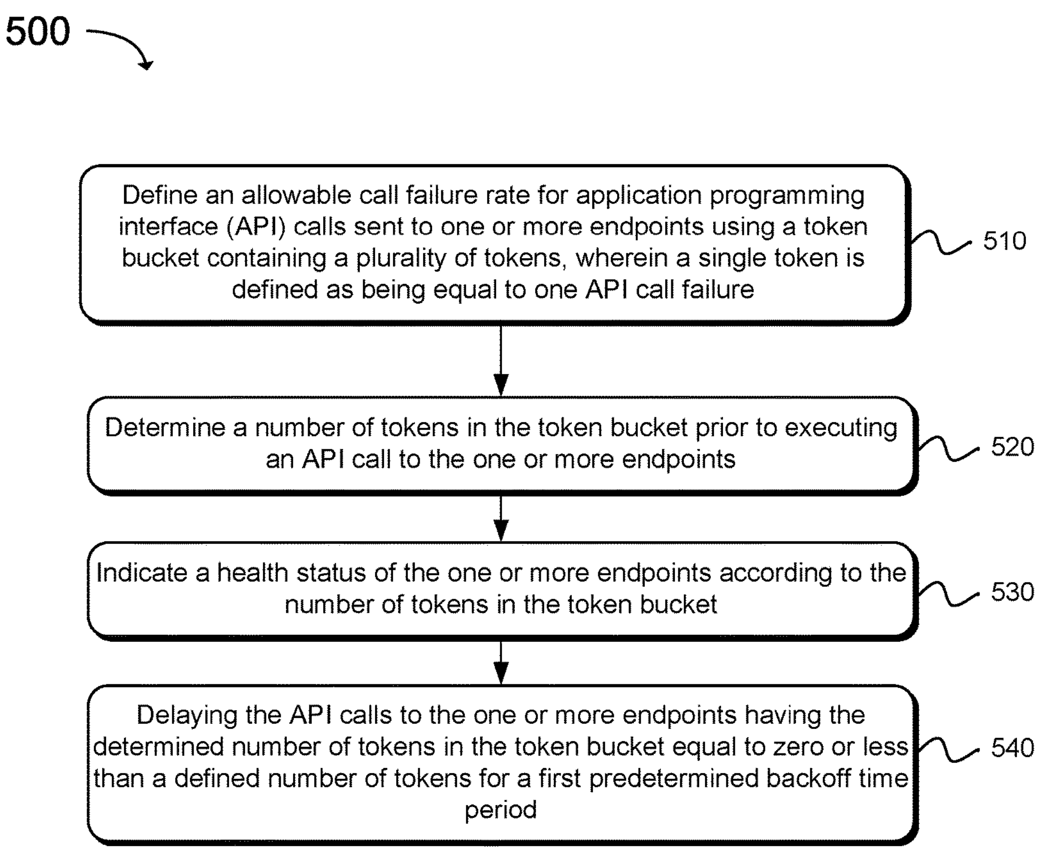
FIG. 5 is a flowchart of an example method for providing endpoint call backoff in a service provider environment according to an example of the present technology.

FIG. 5 is a flowchart of an example method 600 for providing endpoint call backoff in a computing service environment according to an example of the present technology. The functionality may be implemented as a method and executed as instructions on a machine, where the instructions are included on at least one computer readable medium or one non-transitory machine-readable storage medium. For example, starting in block 510, an allowable call failure rate may be defined for application programming interface (API) calls sent to one or more endpoints using a token bucket containing a plurality of tokens, wherein a single token is defined as being equal to one API call failure. A number of tokens in the token bucket may be determined prior to executing an API call to the one or more endpoints, as in block 520. A health status of the one or more endpoints may be identified according to the number of tokens in the token bucket, as in block 530. The API calls to the one or more endpoints having the determined number of tokens in the token bucket equal to zero may be delayed for a first predetermined backoff time period, and the one or more endpoints having the determined number of tokens in the token bucket equal to or less than a defined number of tokens or having zero tokens in the token buckets may be defined as unhealthy endpoints, as in block 540.

Figure 6:
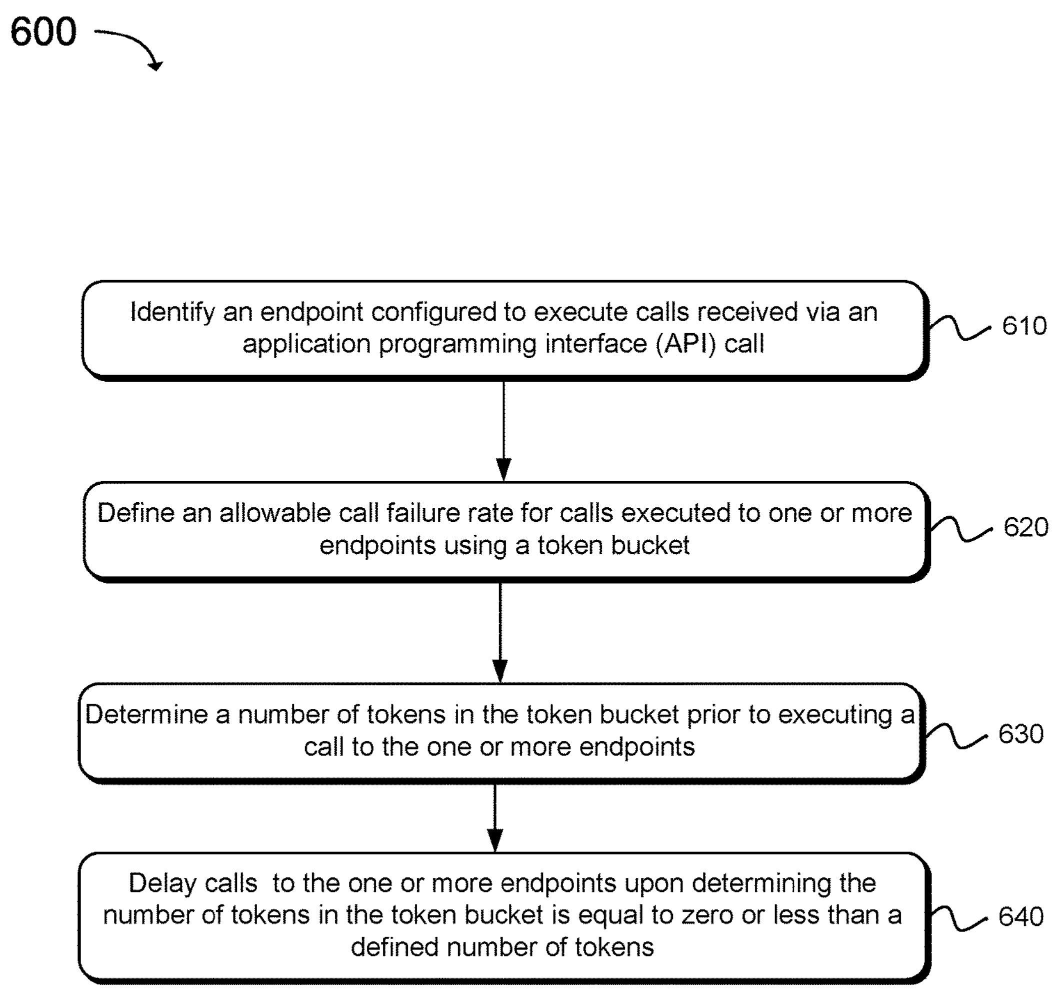
FIG. 6 is a flowchart of an additional example method for providing endpoint call backoff in a service provider environment according to an example of the present technology.

FIG. 6 is a flowchart of an additional example method 600 for providing endpoint call backoff in a service provider environment according to an example of the present technology. The functionality may be implemented as a method executed as instructions on a machine, where the instructions are included on at least one computer readable medium or one non-transitory machine-readable storage medium. Starting in block 610, an endpoint configured to execute calls received via an application programming interface (API) call may be identified. As in block 620, an allowable call failure rate may be defined for calls (e.g., API calls) executed to one or more endpoints using a token bucket. A number of tokens in the token bucket may be determined prior to executing a call to the one or more endpoints, as in block 630. The calls to the one or more endpoints may be delayed upon determining the number of tokens in the token bucket is zero or equal to or less than a defined number of tokens (e.g., there are no usable tokens in the token bucket), as in block 640.

Figure 7:
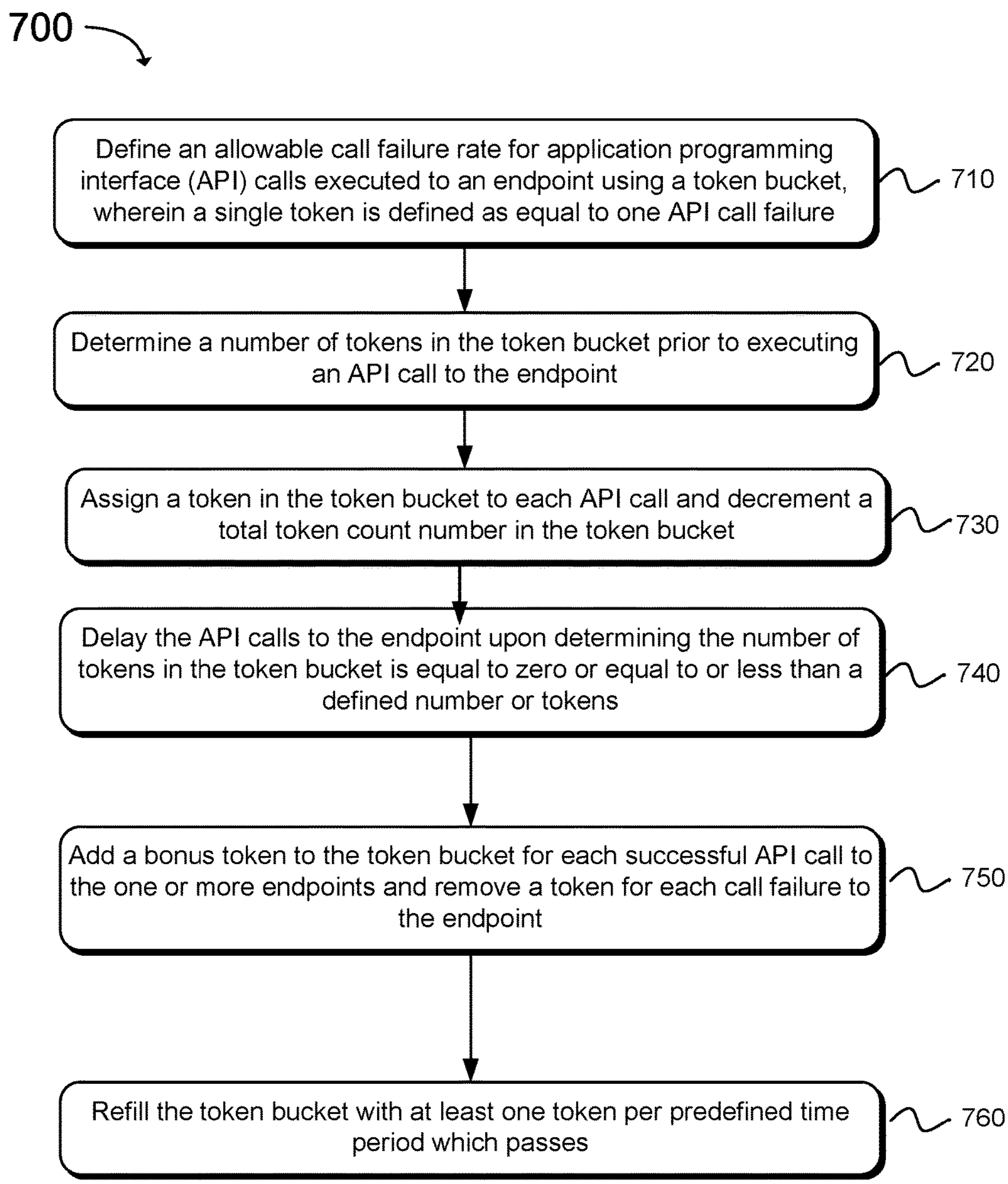
FIG. 7 is a flowchart of an additional example method for providing additional endpoint call backoff operations and evicting least recently used (LRU) endpoints in a service provider environment according to an example of the present technology.

FIG. 7 is a flowchart of an additional example method 700 for providing additional endpoint call backoff and evicting least recently used (LRU) endpoints in a service provider environment according to an example of the present technology. The functionality may be implemented as a method executed as instructions on a machine, where the instructions are included on at least one computer readable medium or one non-transitory machine-readable storage medium. Starting in block 710, an allowable call failure rate may be defined for application programming interface (API) calls executed to an endpoint using a token bucket, wherein a single token is defined as equal to one API call failure. A number of tokens in the token bucket may be determined prior to executing an API call to the endpoint, as in block 720. A token in the token bucket may be assigned to each API call and decrement a total token count number in the token bucket, as in block 730. The API calls to the endpoint may be delayed (e.g., an exponential delay) upon determining the number of tokens in the token bucket is equal to zero or equal to or less than a defined number of tokens, as in block 740. One or more bonus tokens may be added to the token bucket for each successful API call to the one or more endpoints and remove a token for each call failure to the endpoint, as in block 750. The token bucket may be refilled with at least one token per predefined time period, which passes, as in block 760.

In one aspect, in conjunction with and/or as part of at least one block of FIGS. 5-7, the operations of 500, 600, and/or 700 may include each of the following. In one aspect, the operations of 500, 600, and/or 700 may include performing each of the following. In one aspect, the delaying may be referred to as an "exponential delay" or "exponential backoff" operation where the delay of API calls is for a first time period and each subsequent delay of the API calls is exponentially larger than the most recent delay of the API calls. In one aspect, the calls (e.g., API calls) may be delayed to the one or more endpoints for a second predetermined backoff time period, wherein the second predetermined backoff time period is double the first predetermined backoff time period. In one aspect, the delaying may be referred to as an "exponential delay" or "exponential backoff" operation where the delay of API calls is for a first time period and each subsequent delay of the API calls is exponentially larger than the most recent delay of the API calls.

In one aspect, the allowable failure rate can be defined as one call failure per second for sending calls to the one or more endpoints or receiving calls from the one or more endpoints. Alternatively, the allowable failure rate can be defined as a percentage of total call failures per predetermined time period for sending calls to or receiving calls from the one or more endpoints. In another aspect, a single token being removed from a bucket may be defined as being equal to one call failure (e.g., one API call failure) to the one or more endpoints.

In one aspect, the health status of the one or more endpoints may be identified as healthy or unhealthy according to the number of tokens in the token bucket. The unhealthy state of the one or more endpoints may be defined as having a number of tokens in the token bucket below a predetermined number of tokens. The healthy state of the one or more endpoints may be defined as having a number of tokens in the token bucket above a predetermined number of tokens.

In one aspect, an endpoint tracker key may be used. The endpoint tracker key may specify an endpoint identification (ID) in order to access information relating to the one or more endpoints and the number of tokens in the token bucket for each of the one or more endpoints. Using the endpoint tracker key, the information for each of the one or more endpoints may be collected accordingly. For example, the health state of the one or more endpoints may be identified according to the collected information In one aspect, an endpoint tracker key may be used to identify a health status of endpoints. The endpoint tracker key may be used for grouping endpoints according to the determined health status of the endpoints. The endpoint tracker key may also be used to represent one or more endpoints, one or more combinations of properties of a request, a data stream type, a device type, network localities of a user issuing a request, or a geographical locality of a user. For example, endpoints may be associated with a device type (or classification of devices) as identified by an endpoint tracker key and the endpoints may be determined to be unhealthy. The unhealthy endpoints associated with a device type may be grouped together. Accordingly, the endpoint backoff operations may be executed for those devices associated with unhealthy endpoints.

In one aspect, the number of tokens in the token bucket may be tracked. Also, one or more predetermined and/or a bounded number of endpoints may be tracked and monitored. In one aspect, a percentage of the one or more endpoints exceeding the allowable call failure rate may be identified. A flag may be set for the one or more endpoints exceeding the allowable call failure rate to trigger delaying the calls to the one or more endpoints. An alert may be issued indicating the percentage of the one or more endpoints exceeding the allowable call failure rate.

In one aspect, the token bucket may be refilled with at least one token per predefined time period which passes. In one aspect, one or more bonus tokens may be added to the token bucket, for one or more of the endpoints upon executing a predetermined number of successful calls to the one or more endpoints. In one further aspect, a token may be removed from the token bucket upon each occurrence of a call failure to the one or more endpoints.

In one aspect, each token in the token bucket may be tracked. Also each time the token bucket is refilled may also be tracked (e.g. track the time when the token bucket was last refilled). Subsequently, an additional API call is issued. However, a determination may be made to check if there are tokens in the token bucket. If there are no tokens in the token bucket when the subsequent API call is issued, a determination is made as to when the most recent refill operation was performed to determine if a refill operation is to be performed for issuing a token and then assigning the issued token to the subsequent API call. For example, assume a refill rate is set to add at least one token per second. If the subsequent API call is issued when there are no tokens in the token bucket and only a half second of time has passed since the most recent refill operation was performed, the subsequent API call at the half second time period can be deemed as an API failed call. Alternatively, if the subsequent API call is issued when there are no tokens in the token bucket and a full second has passed since the most recent refill operation was performed, an additional token can be added to the empty token bucket and assigned to the subsequent API call. Thus, the subsequent API call can be deemed as a successful API call.

In one aspect, the service provider environment may include one or more services executing on a server or other computer hardware. Such services may be centrally hosted functionality or a service application that may receive requests and provide output to other services or customer devices. For example, modules providing services may be considered on-demand computing that are hosted in a server, cloud, grid, or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

Figure 8:
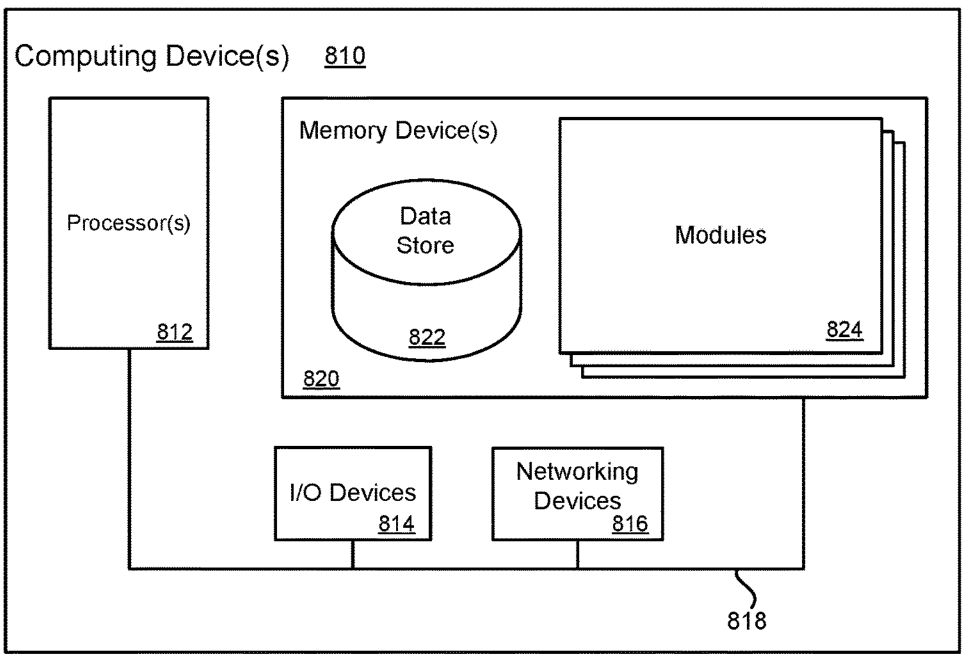
FIG. 8 is a block diagram that provides an example illustration of a computing device that may be employed in the present technology.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device may include a local communication interface 818 for the components in the computing device. For example, the local communication interface may be a local data bus and/or any related address or control busses as may be desired.

The memory device 820 may contain modules 824 that are executable by the processor(s) 812 and data for the modules 824. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen that is available to display output from the computing devices. Other known I/O device may be used with the computing device as desired. Networking devices 816 and similar communication devices may be included in the computing device. The networking devices 816 may be wired or wireless networking devices that connect to the Internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid-state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method for providing an endpoint backoff operation in a computing service environment, the method comprises:
- under control of at least one processor and memory configured with executable instructions that:
- define an allowable call failure rate for application programming interface (API) calls sent to one or more endpoints, and the allowable call failure rate is defined using a token bucket for storing a plurality of tokens, wherein removal of a single token from the token bucket is defined as being equal to one API call failure, and one or more additional tokens are added to the token bucket when a predetermined number of successful calls are sent to and executed by the endpoint;
- determine a number of tokens in the token bucket prior to executing an API call to the one or more endpoints;
- identify a health status of the one or more endpoints according to the number of tokens in the token bucket;
- determine that the one or more endpoints, having a number of tokens in the token bucket that is equal to zero or less than a defined number of tokens, are unhealthy; and
- delay the API calls to the one or more endpoints determined to be unhealthy.

2. The method of claim 1, wherein the executable instructions further delay the API calls to the one or more endpoints for a second predetermined backoff time period, wherein the second predetermined backoff time period is greater than a first predetermined backoff time period.

3. The method of claim 1, wherein the executable instructions further define the allowable call failure rate as one API call failure per predetermined unit of time for sending API calls to the one or more endpoints or receiving API calls from the endpoints.

4. The method of claim 1, wherein the executable instructions further define the allowable call failure rate as a percentage of calls per total number of calls in a predetermined time period for sending the API calls with the one or more endpoints or receiving the API calls to the one or more endpoints.

5. The method of claim 1, wherein the executable instructions further:
- poll a total number of tokens in the token bucket at predetermined token tracking time periods; and
- remove a token from the token bucket upon each occurrence of an API call failure to the one or more endpoints.

6. The method of claim 1, wherein the executable instructions further:
- determine a least recently used endpoint from the one or more endpoints;
- define the least recently used endpoint as operating in a healthy state; and
- remove the least recently used endpoint from the one or more endpoints.

7. A method for providing call failure backoff in a computing service environment, the method comprises executable instructions that:
- identify an endpoint configured to execute calls received as an application programming interface (API) call;
- define an allowable call failure rate for calls executed to an endpoint;
- determine a number of tokens in a token bucket for the endpoint prior to sending a call to the endpoint for execution, wherein a token represents a call failure, and one or more additional tokens are added to the token bucket when a predetermined number of successful calls are sent to and executed by the endpoint; and
- delay calls to the endpoint upon determining the number of tokens in the token bucket is less than a defined number of tokens.

8. The method of claim 7, wherein the executable instructions for exponential backoff operations further:
- delay the calls to the endpoint during a first predetermined backoff time period upon determining the number of tokens in the token bucket is less than the defined number of tokens;
- send an unsuccessful call to the endpoint after the first predetermined backoff time period;
- enter into a second predetermined backoff time period; and
- delay the calls to the endpoint during the second predetermined backoff time period upon determining the number of tokens in the token bucket is less than the defined number of tokens, wherein the second predetermined backoff time period is double the first predetermined backoff time period.

9. The method of claim 7, wherein the executable instructions further define an allowable failure rate as one call failure per second for calls sent to the endpoint.

10. The method of claim 7, wherein the executable instructions further define an allowable failure rate as a percentage of total calls per predetermined time period for calls sent to the endpoint.

11. The method of claim 7, wherein the executable instructions further:
- assign a token in the token bucket to each API call failure;
- define a selected token as equal to one call failure to the endpoint;
- decrement a total token count number in the token bucket upon a call failure;
- define an unhealthy state of the endpoint as having a number of tokens in the token bucket below a predetermined number of tokens; and
- define a healthy state of the endpoint as having a number of tokens in the token bucket above or equal to a predetermined number of tokens.

12. The method of claim 7, wherein the executable instructions further:
- use an endpoint tracker key specifying an endpoint identification (ID) to access information relating to the endpoint and the number of tokens in the token bucket for each of a plurality of endpoints;

collect information for each of the endpoints according to the accessed information; and determine a health state of each of the endpoints according to the information collected.

13. The method of claim 7, wherein the executable instructions further track the number of tokens in the token bucket.

14. The method of claim 7, wherein the executable instructions further:

determine a percentage of the calls to the endpoint exceeding the allowable call failure rate;

set a flag for an endpoint that has a number of tokens in a token bucket below the allowable call failure rate to trigger delaying the calls to the endpoint; and issue an alert indicating the percentage of the calls to the endpoint exceed the allowable call failure rate.

15. The method of claim 7, wherein the executable instructions further refill the token bucket with at least one token per passing of a predefined time period.

16. The method of claim 7, wherein the executable instructions further remove at least one token from the token bucket upon each occurrence of a call failure to the endpoint.

17. The method of claim 7, wherein the executable instructions further:

determine the endpoint is a least recently used endpoint in a group of endpoints;

define the least recently used endpoint as operating in a healthy state; and remove the least recently used endpoint from the group of endpoints.

18. A method for providing a call failure backoff in a computing service environment, the method comprises:

defining an allowable call failure rate using a token bucket for application programming interface (API) calls executed on an endpoint, wherein a single token is defined as being equal to one API call failure;

determining a number of tokens in the token bucket prior to executing an API call at the endpoint;

assigning a token in the token bucket to failed API calls;

decrementing a total token count number in the token bucket when the failed API calls are identified;

delaying API calls to the endpoint upon determining the number of tokens in the token bucket is equal to zero;

adding an additional token to the token bucket for each successful API call to the endpoint; and refilling the token bucket with at least one token per predefined time period that has passed.

19. The method of claim 18, further comprising:

defining a selected token as equal to one call failure to the endpoint;

removing a token from the token bucket for each call failure to the endpoint;

defining an unhealthy state of the endpoint as having a number of tokens in the token bucket below a predetermined number of tokens; and defining a healthy state of the endpoint as having a number of tokens in the token bucket above a predetermined number of tokens.

20. The method of claim 18, further comprising;

using an endpoint tracker key to identify a health status of endpoints; and using the endpoint tracker key for grouping endpoints according to the health status.

21. The method of claim 20, wherein, the endpoint tracker key represents one or more endpoints, one or more combinations of properties of a request, a data stream type, a device type, network localities of a user issuing a request, or a geographical locality of a user.

* * * * *